Sept. 24, 1957  U. SEGRE  2,807,535
METHOD OF AND PLANT FOR REDUCING IRON ORE
Filed March 17, 1954  2 Sheets-Sheet 1

United States Patent Office 2,807,535
Patented Sept. 24, 1957

2,807,535
METHOD OF AND PLANT FOR REDUCING IRON ORE

Uberto Segre, Turin, Italy, assignor to "Vetrocoke" S. p. A., Turin, Italy

Application March 17, 1954, Serial No. 416,831

Claims priority, application Italy March 17, 1953

8 Claims. (Cl. 75—35)

This invention relates to processes and plants for reducing iron ore.

Processes for obtaining metallic iron in a substantially solid condition (iron sponge) direct from ore without melting it as in blast furnaces for the production of pig iron are known and are industrially employed with success on a large scale.

Figure 1:
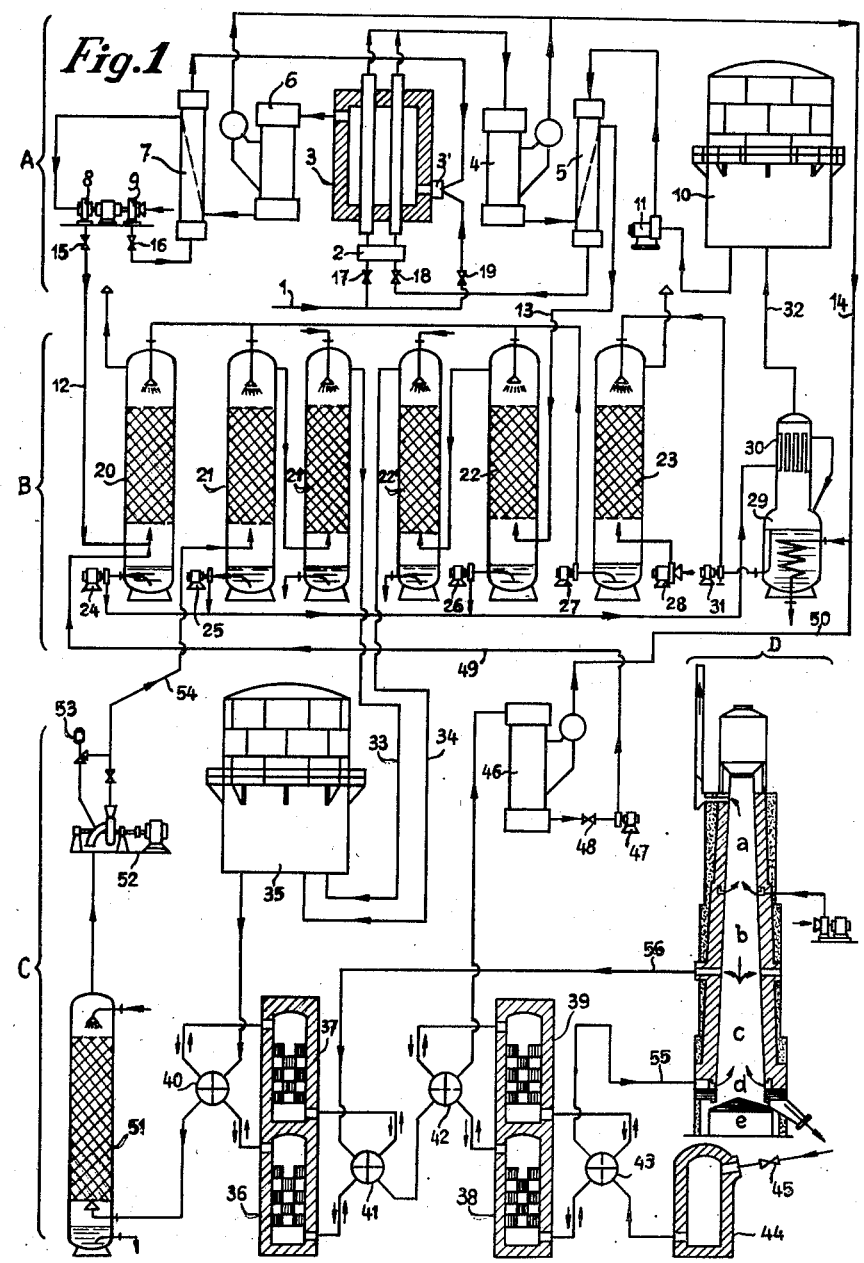

One of the processes with which this invention is more directly connected is that known to experts in the field as the Wiberg-Soderfors process, in which the ore is charged at the top of a furnace shown in Figure 1, section D and is converted to iron sponge through the following steps:

(1) Air is blown at the pre-heating region $a$ near the furnace top and burns the gas contained therein. This step pre-heats the ore and expels sulphur by roasting.

(2) The ore is converted to FeO in the pre-reduction region $b$ beneath the pre-heating region. This conversion takes place with heat absorption at the expense of the heat contained in the pre-heated ore which falls from the region $a$.

(3) Final reduction zone $c$. The hot gases entering at the bottom of the furnace reduce the ore to metallic iron. The reaction in this step in addition to the heat contained in the gas raises the temperature up to 1000° C.

The iron sponge is conveyed through a cooling region $d$ and is removed from the furnace over a conical rotary discharge table $e$. Wiberg's furnace is fed with a gas produced in a known manner and containing approximately 80–85% CO and 15–20% $H_2$, at a temperature of 900–1000° C.

Part of the gas having flown through the final reducing region of the furnace and containing a certain quantity of $CO_2$ is drawn in known processes by a suction fan (not shown) right beneath the prereduction region and is regenerated by causing it to flow over incandescent coke contained in an electrically heated carburising chamber (not shown), where carbon dioxide reacts with carbon from coke to form carbon monoxide. The hydrogen in the gas is produced by adding kerosene or water into the carburising chamber. The regenerated gas flows back to the furnace. By controlling by means of the suction fan the quantity of gas flowing through the furnace and by controlling the gas temperature as well (this latter by supplying power to the electrodes of the carburising chamber) and by adjusting the rate at which the ore descends through the furnace, the desired extent of reduction is obtained.

The gas is conveyed through a limestone filter before returning to the furnace, in order to remove the sulphur collected by the gas on flowing over the coke in the carburising chamber. The phosphorus in the ore can be removed in various manners, so that the resulting iron sponge is an exceptionally pure product.

This process gives rise to drawbacks of two kinds.

Due to the equipment the interlocking of the various steps is very weak at the main suction fan which is called upon to operate in a continuous manner on a gas at a very high temperature.

From an economic standpoint the process is not always satisfactory. In fact, most of the power consumed for reducing the iron ore is electric power which is generally very expensive.

The process employed heretofore suffers from a further drawback in that it is not logical from the standpoint of chemical kinetics.

The gas to be regenerated contains, as mentioned above, a certain quantity of $CO_2$ which may amount up to 30%, and still contains more than 50% CO, so that a full regeneration would not be afforded even at high temperature and at equilibrium and with prolonged contact periods. For instance, at 700° C. the equilibrium constant between C, CO and $CO_2$ equals 1.20. Initially, out of 100 parts gas, 30 consists of $CO_2$ and 50 consists of CO, so that reaction is arrested as the following balances are reached:

$$\frac{[CO]^2}{[CO_2]} \cdot \frac{1}{100} = 1.20$$

$$[CO] + [CO_2] = 80$$

which are met with $[CO]=55$ and $[CO_2]=25$, that is, when the sixth part only of $CO_2$ initially present has been regenerated.

In fact, in processes employed heretofore the temperature should be raised up to 1000° C. in order to afford a full regeneration.

The object of this invention is to provide an improved process which eliminates all the abovementioned drawbacks.

In the process according to this invention, the gas issuing from the reduction furnace is cooled through suitable heat recovering means and subsequently washed with a liquid adapted to chemically absorb $CO_2$, such as solutions of sodium or potassium carbonate, phosphate, phenolate, organic compounds of amines or their derivatives, for instance in accordance with the process disclosed by applicant's abandoned application Ser. No. 240,129 and application Ser. No. 548,472, filed November 22, 1955. During or after this step, the gas is cooled, for instance by a water shower, in order to condense most of the steam contained therein. The result is a gas of a centesimal composition suitable for feeding the furnace, but in a quantity smaller than actually required.

The missing quantity needed for balance is supplied by a separate plant which may employ, instead of electric power, less expensive rawstuffs such as coal, oxygen, recovery steam and, as the case may be, methane and other hydrocarbons, for instance in accordance with the process described in applicants' Italian Patent No. 499,592 for "Process for the Production of a Reducing Gas from Methane and Other Hydrocarbons Suitable for the Reduction of Iron Ore."

All the resulting gas including both the recovered and separately produced quantities is cold. Before it is admitted to the furnace, it should be pre-heated by utilising the heat yielded by the gas issuing from the furnace, supplemented by heat from an independent source.

Example

A reduction furnace for iron ore is fed at the bottom with a gas of the following composition, at a temperature ranging between 900 and 1000° C.

|  | Volumes |
|---|---|
| CO | 82.5 |
| $H_2$ | 17.5 |
|  | 100.0 |

At about mid-height of the furnace, out of 100 volumes supplied gas, 75 volumes gas are recovered at a temperature of about 850° C., the remaining 25 volumes serving for the steps to be carried out in the furnace top portion.

The 75 volumes gas recovered contain:

|  | Volumes |
|---|---|
| $H_2O$ | 5.2 |
| $CO_2$ | 21.7 |
| CO | 40.2 |
| $H_2$ | 7.9 |
|  | 75.0 |

This gas is washed and cooled and the net result is, upon deduction of losses, approximately

|  | Volumes |
|---|---|
| CO | 38.0 |
| $H_2$ | 7.5 |
|  | 45.5 | so that, in order to obtain again the 100 volumes gas required for feeding the furnace, the supplementing plant should supply:

|  | Volumes |
|---|---|
| CO | 44.5 |
| $H_2$ | 10.0 |
|  | 54.5 |

As mentioned above, 75 volumes gas, which are available at the inlet of the heat recovery apparatus at a temperature of approximately 800°, are recovered and recycled; the heat recovery apparatus is arranged to preheat 100 volumes gas from ordinary temperature up to 900–1000° C.

Figure 2:
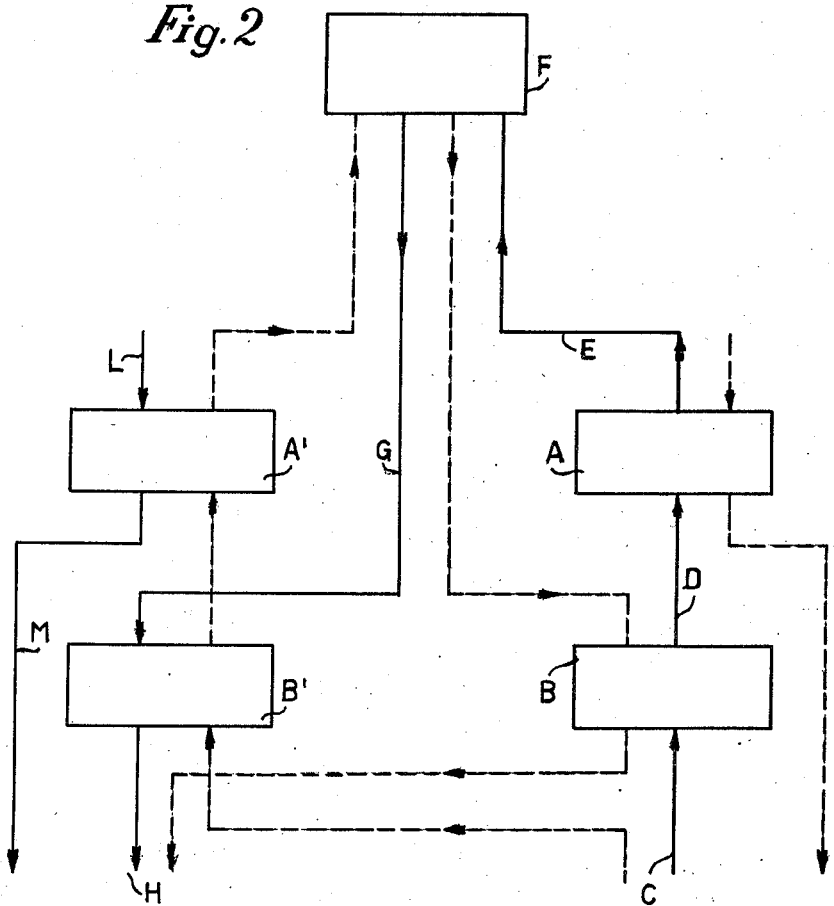

It will be obvious that the re-cycled gases can supply but a part of the required heat. The balance is derived from an independent source, such as a methane flame; in the end, the operating conditions are as diagrammatically shown in Figure 2.

In said figure, F diagrammatically denotes the ore reduction furnace, associated with two sets of regenerators A, A', and B, B'. The full lines C, D, E denote the path of the gas stream entering the furnace.

The reducing gas from the gas holder (not shown) and containing substantially CO+$H_2$ only at ordinary temperature reaches the regenerator B where it is heated to an average temperature of about 530° C., thence it flows to the regenerator A where its average temperature rises up to about 950° C. The gas flows from the regenerator A to the furnace F in a quantity which is assumed to equal 100 volumes.

The gas stream issuing from the furnace which is supposed to equal 75 volumes follows the path denoted by the line G and reaches the regenerator B' at a temperature of about 800° C. The gas leaves the regenerator B' at an average temperature of 250° C. after having yielded part of its heat and is conveyed over the path denoted by H for further conversion.

At the same time, the fumes of a methane and air flame reach the regenerator A' from a separate combustion chamber (not shown on the drawing) at a mean temperature of 1050° C. along the path denoted by L in a quantity corresponding to the combustion of approximately 3 volumes methane with 30 volumes air.

The fumes from the methane flame leave the regenerator A' along the path denoted by M.

In a second step of the process the inlet and outlet streams are reversed, the gases following the paths denoted by dash lines.

The fumes from the methane flame available at the outlet from the regenerator A' at a temperature exceeding 600° C. can be further exploited by utilising both their appreciable heat and their $CO_2$ content.

On issuing from the regenerator B', the re-cycled gas is washed and cooled in a scrubber down to the temperature required for the chemical washing of $CO_2$.

If the gas contains hydrogen sulfide from the sulphur in the ore as impurity, there can be arranged following the scrubber a dry desulphurizing tower of the type employing Lamig's mass. The cooled and, as the case may be, desulphurized gas is drawn by the main blower fan and conveyed to the decarbonation plant where the chemical washing of the $CO_2$ contained in the gas is carried out. The blower fan should be provided with a device, such as a by-pass valve, operatively connected with the reversing gear, in order to avoid underpressure or abnormal pressure as reversing takes place. It may be mentioned that this additional structure is a negligible complication as compared with the enormous advantage deriving from the fact that the blower fan operates on cold gas, which has been washed, freed from powders and even desulphurized, while the blower fan of Wiberg's plant operates under extremely serious conditions on account of the very high temperature—over 800° C.—the powder content and thermal and chemical aggressivity of the gas.

As mentioned above, a separate supplementing plant shall produce to 100 volumes gas admitted into the furnace 54.5 volumes gas composed as follows:

|  | Volumes |
|---|---|
| CO | 44.5 |
| $H_2$ | 10.0 |
|  | 54.5 |

This gas may conveniently be produced from different rawstuffs such as coal, natural gas, other gases, and liquid fuels.

More particularly, the reaction of methane in a reforming plant in the presence of a considerable excess of $CO_2$ gives a reformed gas of the abovementioned composition according to the process disclosed by applicants' Italian Patent No. 499,592.

This step can be carried out as described in either of the following three examples. According to the first example, reaction takes place at a temperature of 1000° C. in a chamber shaped furnace, fed with methane, oxygen and a large excess of carbon dioxide. According to the second example, reaction occurs at a temperature of 700° C. in a furnace of the tube bundle type within the tubes made of stainless steel which are heated from the outside by a methane flame. In the third instance reaction takes place at a temperature of 1000° C. within the tubes of a tube bundle furnace, the tubes being made of carborundum and heated from the outside by a methane flame.

In all three cases, more particularly in the two last mentioned ones, the reaction is carried out in the presence of a catalyst.

In the examples described hereafter the thermal process in the methane reforming furnace is balanced on completion, if it be assumed that part of the heat of the reformed gas and part of the fume heat are recovered by a suitable heat exchange with the gases and combustion air supplied to the furnace. This is within the normal practice in methane reforming furnaces already industrially in use.

| | Examples | | |
|---|---|---|---|
| | Oxygen furnace | Stainless steel tube furnace | Carborundum tube furnace |
| Operating temperature, ° C | 1,000 | 700 | 1,000 |
| Centesimal composition of the reformed gas: | | | |
| $H_2O$, percent | 20.5 | 9.2 | 15.0 |
| $CO_2$, percent | 51.4 | 61.8 | 37.7 |
| CO, percent | 22.9 | 23.7 | 38.6 |
| $H_2$, percent | 5.2 | 5.3 | 8.7 |
| Gas volumes to be supplied for obtaining 44.5 volumes CO+ 10.0 volumes, $H_2$, considering 5% losses: | | | |
| $CH_4$ | 26.5 | 14.5 | 14.0 |
| $CO_2$ | 128.0 | 157.0 | 91.0 |
| $O_2$ | 22.5 | | |
| $CH_4$ volumes required for heating tube furnaces | | 14.0 | 11.5 |

The gas issuing from the furnace is cooled to a suitable temperature and subsequently washed with a liquid capable of chemically absorbing $CO_2$, for instance in accordance with the process disclosed by applicant's U. S. patent application Ser. No. 240,129. During or after this step, the gas is cooled, for instance by a water shower, in order to condense most of the steam contained therein.

After these steps, in all three examples considered, the gas contains 10.0 volumes $H_2$ and 44.5 volumes CO, besides residual moisture depending upon its temperature. The gas composition is therefore of the abovementioned requisite composition for supplementing the gas supplied to the iron ore reduction furnace.

In any case, whether the rawstuff employed is coal, natural gas, other gases of liquid fuels, large $CO_2$ quantities should be made available for producing this supplementing gas. A prevailing part of the required $CO_2$ is obtained by regenerating the solution employed for chemically washing $CO_2$ both from the re-cycled gas and the gas supplied by the supplementing plant.

The operation of the plant will be better understood from the following detailed description of the diagram of the plant shown in Figure 1. The diagram shows the complete plant, but for a few unavoidable simplifications. The operating cycle has been ideally subdivided into four parts or sections:

Section A comprises the plant for preparing the gas required to supplement the furnace supply. In the drawing this plant is of the type disclosed by applicant's Italian Patent No. 499,592.

Section B comprises the plants for decarbonating the gas and regenerating the washing solution with $CO_2$ recovery;

Section C comprises the circuit for the re-cycled gas from Wiberg's furnace and the circuit for the gas feeding the latter furnace with their respective cooling and preheating plants as well as the main blower;

Section D includes Wiberg's furnace proper.

Section A.—The furnace shown on the drawing is tube bundle furnace heated by a methane flame. The use of a furnace carrying out the autothermic process by the use of oxygen would simplify the diagram. In the example considered the methane from pipe 1 is subdivided into two streams. The methane for reaction flows to the mixer 2 which also receives carbon dioxide from the gas holder 10 blown by the fan 11. The mixture of the two gases is subdivided as it leaves the mixer into the tubes filled with catalyst extending through the furnace 3 in which reaction takes place. The reaction gases yield part of their heat to the recovery boiler, which converts it to steam, then to the heat exchanger 5 where they preheat $CO_2$, the gases then flowing through pipe 13 to decarbonation.

The second methane stream intended to heat the furnace flows to the burner 3' where it is burned with air blown by the fan 9. The fumes issuing from the furnace 3 yield part of their heat to the recovery boiler 6, which converts it to steam, then to the heat exchanger 7 where they pre-heat the combustion air, whereupon they are drawn by the exhaust fan 8 which conveys them by the pipe 12 to the $CO_2$ recovery.

The valves 15, 16, 17, 18 and 19 diagrammatically show the control appliances arrangement for insuring correct and safe operation of the furnace.

Section B.—This section recovers $CO_2$ contained in the fumes flowing from Section A over pipe 12 and from Section C over pipe 49, eliminates from the gas cycle excess steam and recovers $CO_2$ contained in the gases flowing from Section A and C through pipes 13 and 54, respectively.

Decarbonation and part condensation of steam take place in a set of towers through a suitable liquid shower, such as a solution of sodium or potassium carbonate, phosphate, phenolate, organic compounds or amines or their derivatives by any known process, such as the process for decarbonating and desulphurizing gaseous mixtures disclosed by applicant's abandoned application Ser. No. 240,129 and application Ser. No. 548,472 are illustrated and referred to as 20, 21 and 22.

The decarbonated gas contains moisture depending upon its temperature and the corresponding vapor pressure of the washing liquid.

If the moisture content of the gas is excessive by reason of the fact that decarbonation has been carried out at a temperature corresponding to a high vapor pressure of the liquid employed for washing, and such as to disturb the subsequent steps, the decarbonated gas is conveyed through two scrubbers 21' and 22' in which a cool water shower cools the gas and condenses excess moisture.

The gas then flows to the gas holder 35 over pipes 33 and 34.

The exhausted solution is sent by pumps 24, 25, 26 to the regenerator 29 and is pre-heated on the way in condenser 30. The solution is heated to its boiling point by the steam supplied through pipes 14 and 50 by boilers 4, 6 and 46. The evolved $CO_2$ flows to the gas holder through pipe 32. The partly regenerated hot solution is caught by the pump 31 and sprayed into the tower 23 in counter-current with air blown by fan 28. The air stream completes regeneration, cools the solution down to the necessary temperature for decarbonation and effects, if required, reconcentration of the solution by becoming saturated with steam, thereby eliminating excess water which has condensed on flow of the gas through the decarbonating towers.

The fully regenerated re-concentrated solution is received by the pump 27 and returned to the decarbonating towers.

Section C.—This section includes two low-temperature regenerators 36, 37 and two high-temperature regenerators 38, 39 with their respective change-over valves 40 and 41, 42 and 43. The gas from the gas holder 35 flows in the direction of the arrows in full lines through the regenerators 37, 39 and reaches the furnace through the pipe 55. From the furnace part of the gas is re-cycled after final reduction of the ore through pipe 56, yield its heat to regenerator 36, is washed and water cooled in the scrubber 51 and drawn by the main blower 52 which sends it to decarbonation over pipe 54.

The regenerator 38 is heated by the fumes of a methane flame which burns in the combustion chamber 44. These fumes issuing in a still hot condition from the regenerator, are utilised for producing steam in the boiler 46 and are conveyed by the fan 47 to the $CO_2$ recovery.

Operating the change-over valves 40, 41, 42 and 43 the partitions are placed on the diameter indicated by a dash-line and the various gas streams flow in the direction of the dash-line arrows. The regenerator 36 is substituted for the regenerator 37 and vice versa; the same applies to regenerators 38 and 39.

During operation of the change-over valves, the by-pass 53 on the main blower and the control devices diagrammatically shown by valves 45 on methane and 48 on the fumes are at the same time conveniently operated.

*Section D.*—This section includes Wiberg's furnace without any alteration which has been described hereinbefore.

What I claim is:

1. A process for reducing preheated iron ore by means of a gaseous reducing agent prevailingly composed of carbon monoxide and hydrogen in the ratio of at least two parts of carbon monoxide to one part of hydrogen, comprising reducing ferrous oxide to iron with the gaseous agent, regenerating the gaseous agent after it has been utilized by removing the oxidized compounds, supplementing the recovered gaseous agent with the requisite quantity produced by the cracking of methane in a reforming plant in the presence of excess carbon dioxide as the exclusive reagent for the methane and present in the ratio of three to fifteen parts of carbon dioxide to one part methane, pre-heating the supplemental gaseous agent to about 950° C. prior to mixing with the recovered gaseous agent, and recycling the supplemental gaseous agent.

2. A plant for reducing iron ore, comprising in combination a shaft-furnace for treating the iron ore and provided with means for loading iron ore at the top of the furnace, means for discharging sponge iron at the bottom of said shaft-furnace, means for supplying a reducing gas to said furnace directly above the zone at which the sponge iron is discharged, means for recycling a part of the gases leaving the zone of the furnace in which the final reduction of iron oxide to sponge iron takes place, means for feeding air to a zone of said furnace situated above said final reduction zone for burning the part of the gases flowing through the furnace and leaving said final reduction zone, means for preheating said ore charged to the furnace and means for removing burnt gases near the top of the furnace; a gasholder for containing said reducing gas under pressure, a first circuit for conveying said reducing gas from said gasholder to said zone of the furnace situated directly above the zone at which the sponge iron is discharged, a second circuit for conveying said recycled part of gases leaving the zone of the furnace in which final reduction takes place to said gasholder, means for effecting heat exchange between said gas recycled from the furnace and the gas conveyed from said gasholder to said furnace for cooling the first mentioned gas and preheating the second mentioned gas, means for further heating the latter up to a temperature of about 950° C. directly before it enters the furnace, said second circuit comprising means for further cooling and desulphurizing the recycled gas which has yielded a part of its heat to the gas being fed from said gasholder to said furnace, a blower for forcing said recycled gas within said second circuit situated behind said means for further cooling and desulphurizing said recycled gas, and means for the chemical washing of carbon dioxide and condensation of the steam contained in said recycled gas inserted between said blower and said gasholder, a plant for conversion of methane to a gas of the same composition as the gas fed to said shaft furnace from said gasholder and for feeding to said gasholder at least the gas quantity required for insuring a continuous run of said shaft-furnace.

3. A plant as claimed in claim 2, wherein said means for effecting the heat exchange between said gas recycled from the furnace and the gas conveyed from said gasholder to said furnace comprises a regenerator embodying a first and a second chamber, each containing a heat storing material and having a first and a second opening situated at its top and at its bottom, respectively, and a first and a second change-over valve associated with said chambers, for connecting the first opening of the first chamber to said gasholder and the first opening of the second chamber to said means for further cooling and desulphurizing the recycled gas and for simultaneously connecting the second opening of the second chamber with the zone of the furnace situated directly above the zone in which the final reduction of the iron monoxide to iron takes place and the second opening of the first chamber with said means for further preheating the gas being fed from said gasholder to said furnace, respectively, and means for bringing said valves simultaneously to a condition in which the first valve connects the first opening of said first chamber with said means for further cooling and desulphurizing the gas recycled and the first opening of the second chamber with the gas holder and the second valve connects the second opening of the first chamber with the said zone of the furnace at which the recycled gas is removed and the second opening of the second chamber with said means for further preheating the gas flowing from said gasholder towards said furnace directly before it enters the latter.

4. A plant as claimed in claim 3, wherein said means for further preheating the gas flowing from said gasholder towards said furnace directly before it enters the latter comprises a regenerator embodying a first and a second chamber each containing a heat storing material and having a first and a second opening situated at its top and at its bottom, respectively, a combustion chamber for generating hot combustion gases and a waste heat utilization plant, and a first and a second change-over valve associated with said regenerator and said combustion chamber, for connecting said first opening of said first chamber to said second valve associated with the regenerator forming the means for exchanging heat between the gas recycled from the furnace and the gas fed from the gasholder to said furnace and for connecting the first opening of said second chamber with said waste heat utilization plant, and simultaneously connecting the second opening of the first chamber with the zone of the furnace situated directly above the zone at which sponge iron is discharged therefrom and the second opening of the second chamber with said combustion chamber, respectively, means being provided for simultaneously bringing said valves to a condition in which the first valve connects the first opening of the second chamber with the said second valve associated with the regenerator forming the means for exchanging heat between the recycled gas and the gas fed from said gasholder to said furnace and the first opening of the first chamber with said waste heat utilization plant and the second valve simultaneously connects said second opening of said first chamber with said combustion chamber and the second opening of said second chamber with said zone of the furnace directly overlaying the iron discharge zone of the latter.

5. A plant as claimed in claim 4, wherein means is provided for the changing-over of the first and second valves simultaneously with the operation of the first and the second valves associated with the regenerator forming the heat exchanging means between the gas recycled from the furnace and the gas fed thereto from said gasholder.

6. A plant as claimed in claim 2, wherein the plant for reforming methane substantially includes a furnace, means for supplying methane and oxygen to said furnace, a gasholder for collecting $CO_2$, means for supplying $CO_2$ from said gasholder to said furnace in order to create excess $CO_2$ during reforming of methane, an apparatus for washing $CO_2$ and condensing $H_2O$ contained in the reformed gas, connected at one end to said furnace and at its other end to the gasholder for collecting the reducing gas to be fed to the furnace for reducing iron ore, and an apparatus for regenerating the washing solution from the $CO_2$ washing apparatus to recover $CO_2$ and convey it to the $CO_2$ gasholder.

7. A plant as claimed in claim 2, wherein the plant for reforming methane includes a furnace, a combustion chamber in said furnace, means for feeding methane and air to said combustion chamber in suitable quantities for the combustion of methane, a bundle of tubes of a heat-resisting material arranged in said combustion chamber and connected at one end to a mixing chamber fed with methane and $CO_2$ from a gasholder collecting $CO_2$, and at their other end with an apparatus for washing $CO_2$ and removing $H_2O$ from the reformed gas, connected to the gasholder containing the reduction gas to be fed to the furnace for reducing iron ore, and an apparatus for regenerating the washing solution from the above mentioned $CO_2$ washing apparatus to recover $CO_2$ and return it to the $CO_2$ gasholder.

8. A plant as claimed in claim 7, wherein the plant for regenerating the washing solution further regenerates the solution from the apparatus for washing $CO_2$ and condensing $H_2O$ contained in the gas recycled from the furnace for the iron ore reduction, the $CO_2$ recovered from said solution being conveyed to the $CO_2$ gasholder.

References Cited in the file of this patent

UNITED STATES PATENTS

| | | |
|---|---|---|
| 1,863,804 | Percy | June 21, 1932 |
| 2,107,549 | Schmalfeldt | Feb. 8, 1938 |
| 2,142,100 | Avery | Jan. 3, 1939 |
| 2,547,685 | Brassert et al. | Apr. 3, 1951 |
| 2,740,706 | Paull et al. | Apr. 3, 1956 |

FOREIGN PATENTS

| | | |
|---|---|---|
| 560,357 | Germany | Oct. 1, 1932 |